US012679450B2

(12) United States Patent
Zipes et al.

(10) Patent No.: US 12,679,450 B2
(45) Date of Patent: Jul. 14, 2026

(54) VEHICLE AXLE AND ITS ARRANGEMENT ON A VEHICLE

(71) Applicant: Bucher Municipal AG, Niederweningen (CH)

(72) Inventors: Alexander Zipes, Ennetbaden (CH); Markus Nyffenegger, Gebenstorf (CH)

(73) Assignee: BUCHER MUNICIPAL AG, Niederweningen (CH)

( * ) Notice: Subject to any disclaimer, the term of this patent is extended or adjusted under 35 U.S.C. 154(b) by 313 days.

(21) Appl. No.: 18/628,137

(22) Filed: Apr. 5, 2024

(65) Prior Publication Data

US 2025/0313263 A1    Oct. 9, 2025

(51) Int. Cl.
| | | |
|---|---|---|
| *B62D 5/30* | (2006.01) | |
| *B62D 5/12* | (2006.01) | |
| *B62D 7/18* | (2006.01) | |

(52) U.S. Cl.
CPC ................. B62D 5/30 (2013.01); B62D 5/12 (2013.01); B62D 7/18 (2013.01)

(58) Field of Classification Search
CPC ............... B62D 5/30; B62D 5/12; B62D 7/18
See application file for complete search history.

(56) References Cited

U.S. PATENT DOCUMENTS

| | | | | |
|---|---|---|---|---|
| 4,718,686 A * | 1/1988 | Dziuba | ..................... | B62D 5/09 |
| | | | | 280/86.757 |
| 6,568,697 B1 * | 5/2003 | Brill | ......................... | B62D 5/14 |
| | | | | 280/124.134 |
| 10,501,111 B2 * | 12/2019 | Engels | ................... | B62D 7/148 |

(Continued)

FOREIGN PATENT DOCUMENTS

| | | |
|---|---|---|
| DE | 19910001 A1 | 9/2000 |
| DE | 102012018993 A1 | 3/2014 |
| EP | 1988004 A2 | 11/2008 |

OTHER PUBLICATIONS

European Search Report of EP4190673A1 Dated May 11, 2022, 2 Pages.

*Primary Examiner* — Richard M Camby
(74) *Attorney, Agent, or Firm* — LUCAS & MERCANTI, LLP; Klaus P. Stoffel

(57)    ABSTRACT

A vehicle axle having: a rigid axle body; two steering knuckles, each articulated pivotably about a respective steering axis to an axial end region of the axle body relative to a longitudinal axis parallel to the track direction; a main steering actuator device formed as a pressure-medium-operated piston-cylinder assembly having two piston rods that extend parallel to the longitudinal axis of the axle body and on the free ends of which an end of a main coupling member is arranged at a respective articulation point, the other end of which main coupling member is articulated to a respective steering knuckle at a respective articulation point; and an auxiliary steering actuator device that acts on one of the steering knuckles. The auxiliary steering actuator device is a piston-cylinder assembly having a piston rod that extends parallel to the longitudinal axis of the axle body and to the free end of which an auxiliary coupling member is articulated at an articulation point, the other end of which auxiliary coupling member is articulated to the steering knuckle at an articulation point that lies on a line parallel to and spaced from the steering axis, through the articulation point of the main coupling member.

12 Claims, 4 Drawing Sheets

(56)                References Cited

U.S. PATENT DOCUMENTS

2006/0096800 A1 *   5/2006   Saibold ................... B62D 7/09
                                                280/93.502
2008/0001380 A1 *   1/2008   Mair ....................... B62D 5/12
                                                280/137.5
2018/0290488 A1 *   10/2018  Kaplan ................ B60B 35/003

* cited by examiner

VEHICLE AXLE AND ITS ARRANGEMENT ON A VEHICLE

BACKGROUND OF THE INVENTION

The invention relates to a vehicle axle having: two steering knuckles, each of which is articulated pivotally about a respective steering axis to one of two articulation regions that are axially spaced from one another in relation to a longitudinal axis parallel to the track direction; a main steering actuator device in the form of a pressure-medium-operated piston-cylinder assembly having two piston rods that extend parallel to the longitudinal axis and on the free ends of which an end of a main coupling member is arranged at a respective articulation point, the other end of which main coupling member is articulated to a respective steering knuckle at a respective articulation point; and an auxiliary steering actuator device that acts on one of the steering knuckles; the invention also relates to the arrangement of said vehicle axle on a vehicle.

In a known vehicle axle of this type (DE 199 10 001 B4), the piston-cylinder assembly of the main steering actuator device is designed as a double-action pressure medium cylinder (synchronous cylinder) and arranged in front of the axle in the direction of travel. In contrast, the auxiliary steering actuator device is arranged behind the axle and consists of a linear electrical steering actuator, one end of which is articulated to an axle body, and the other end of which is articulated to a joint housing of one of the two steering knuckles in such a way that its linear movement direction runs at an acute angle to the linear movement direction of the double-action pressure medium cylinder of the main steering actuator device.

Vehicle axles suitable for municipal vehicles must be made particularly narrow for use in urban areas. Furthermore, a short wheelbase is desired to ensure small turning radii. Furthermore, swinging out of the vehicle tail, caused by overhang, should be minimized. Consequently, the driver's cab is situated in front of the front axle for design reasons, which makes a mechanical connection from the steering column to the steering axes more difficult. Conventionally, mainly mechanical steering gears or hydraulic steering systems are available for this. Such steering gears are large, expensive and heavy, which makes these vehicles very difficult to steer and tires the vehicle driver. In contrast, single-circuit hydraulic steering systems are relatively inexpensive, allow flexible installation and offer the vehicle driver a high degree of steering comfort. Because single-circuit hydraulic steering systems are not fail-safe, they can only be approved up to a maximum use speed of 50 km/h.

To achieve fail-safety of a steering system for agricultural and municipal vehicles, there are two approaches in the prior art.

In the first approach, the hydraulic steering system is additionally equipped with an electrical or pneumatic steering actuator, which is intended to ensure steerability of the vehicle in the event of a fault. Large steering angles of vehicles for municipal use and the large travel distances of the control elements thus required result in a large installation space requirement and can be implemented only with difficulty with the installation of the electrical steering actuator. The electrical steering actuator and its supply lines are protected from damage by obstacles only insufficiently because of their exposed position. Furthermore, the electrical steering actuator must be constructed such that it bears its own weight in addition to the steering forces occurring, wherein the joint elements necessary for introducing the spatially effective strong steering forces between the electrical steering actuator and the steering knuckle or axle body are very large. Errors when actuating the electrical steering actuator can also result in an undesired steering process or blockage of the entire steering system. Therefore, complex safety measures and redundant electronics with correspondingly high safety requirements are necessary. Added to this is outlay on sensors and control technology intended to ensure the synchronism of the hydraulic and electrical steering actuators, in order to avoid strain and/or damage to the steering system.

Known multi-circuit hydraulic systems (EP 1 988 004 B1) having two cylinders that are arranged parallel to one another, the piston rods of which are connected to one another, allow the installation space to be reduced in the width direction but tend to damage the cylinder seals owing to tolerance-induced strain, for which reason they are not considered to be practicable or to meet the demands for the service life of a steering system.

SUMMARY OF THE INVENTION

The invention is based on the object of creating a vehicle axle of the type mentioned in the introduction, which avoids the risk of mutual strain on the main steering actuator device and the auxiliary steering actuator device.

According to the invention, this object is achieved in that the auxiliary steering actuator device is formed by a piston-cylinder assembly having a piston rod that extends parallel to the longitudinal axis and to the free end of which an auxiliary coupling member is articulated at an articulation point, the other end of which auxiliary coupling member is articulated to the steering knuckle at an articulation point that lies on a line, which is parallel to and spaced from the steering axis, through the articulation point of the main coupling member.

In the invention, therefore, the two piston rods of the piston-cylinder assembly of the main steering actuator device are articulated to the steering knuckles that oppose one another in the track direction by means of the main coupling members, which are designed in particular as tie rods, via the articulation points thereof on the piston rod side and on the steering knuckle side. In contrast, the piston rod of the piston-cylinder assembly of the auxiliary steering actuator device is connected only to one of the steering knuckles by means of the auxiliary coupling member, which is designed in particular as a tie rod, via the articulation point thereof on the piston rod side and the articulation point thereof on the steering knuckle side. This ensures an optimized guidance of force both during normal operation and in the event of a fault, since no strain occurs between the cylinder assemblies with this configuration, even without maintaining strict tolerances for the parallel positioning of the piston rods of the piston-cylinder assemblies of the main steering actuator device and the auxiliary steering actuator device.

Thanks to the parallel orientation of the piston-cylinder assemblies parallel to the longitudinal axis, the full stroke of the cylinders can be used, as a result of which a maximum steering angle is achieved with the invention.

The invention allows the use of two parallel steering circuits for the main steering actuator device and the auxiliary steering actuator device, as a result of which the steerability of the vehicle axle is always ensured even in the event of a fault, for example a failure of a steering circuit owing to a burst hose. An immediate response of the hydraulic system is not required, since the main and auxiliary steering systems are always engaged. The invention is therefore a fail-safe solution that is tolerant of faults, for example burst hoses, and ensures steerability of a vehicle provided with the vehicle axle according to the invention at all times and has no dead time between the occurrence of the fault and the activation of the emergency system, even if one steering circuit fails.

Furthermore, the invention allows space-saving and protected integration of the steering system, which can ensure large steering angles desired for municipal and agricultural technology. At the same time, a high degree of flexibility is also ensured by facilitating the integration of the steering system for both left- and right-hand drive vehicles.

The invention also allows simplifications in terms of the hydraulic complexity of the system and thus savings of direct costs, for example material costs, and indirect costs, for example for assembly and calibration.

There are also numerous improvements in system behavior during a fault, for example owing to the failure of a hydraulic circuit, in that the steerability of the vehicle remains ensured without an immediate reaction of the system being necessary.

The main and auxiliary steering actuator devices according to the invention avoid undesired mutual influences, in particular blockages or undesired steering movements resulting from the blocking or the unintentional actuation of one of the systems.

Preferably, the piston-cylinder assembly of the main steering actuator device is designed as a synchronous cylinder in which the two piston rods are arranged on both sides of its piston. This allows a reduction in the width of the steering system and the space-saving and protected installation of same. In this regard, it is also expedient that the piston-cylinder assemblies of the main steering actuator device and the auxiliary steering actuator device are arranged over one another in relation to the directions of the longitudinal axes.

Within the scope of the invention it is provided in particular for the articulation regions of the steering knuckles to be formed on axial end regions of a rigid axle body.

In a structurally expedient manner, the piston-cylinder assemblies of the main steering actuator device and of the auxiliary steering actuator device are fastened to the axle body.

An advantageous embodiment of the invention consists in that the piston-cylinder assemblies of the main steering actuator device and of the auxiliary steering actuator device have the same design. The use of identical piston-cylinder assemblies for the main and auxiliary steering systems results in reduced costs, owing to higher part production rates and lower variety of parts, and in lower system complexity.

Preferably, the pressure medium for the operation of the piston-cylinder assemblies is a hydraulic fluid.

Within the scope of the invention, it is also provided for the cylinder of the main steering actuator device and/or the cylinder of the auxiliary steering actuator device to be connected to a steering orbitrol used for the pressure medium operation of the cylinder. In particular, a main steering orbitrol is provided for the main steering actuator device, and an auxiliary steering orbitrol is provided for the auxiliary steering actuator device. These orbitrols are connected to the steering wheel of a vehicle equipped with the vehicle axle according to the invention. They convert the rotation of the steering wheel into a linear movement of the piston rods of the piston-cylinder assemblies by applying a corresponding amount of pressure medium to the piston in question. For safety reasons, in particular fail-safety reasons, the main steering orbitrol must be mechanically connected form-fittingly to the steering wheel or the mechanical steering device, whereas the auxiliary steering orbitrol can also be connected force-fittingly, for example via a belt.

The steering orbitrols are a valve combination and a fail-safe hydraulic pump at the same time and therefore, in the event of an interruption of the pressure medium supply, can convey hydraulic fluid, solely by rotation of the steering wheel, to the steering cylinders connected thereto and thereby ensure the steerability of the vehicle.

BRIEF DESCRIPTION OF THE DRAWING

An embodiment of the invention is explained in more detail below with reference to the drawings. In the figures.

DETAILED DESCRIPTION OF THE INVENTION

Figure 1:
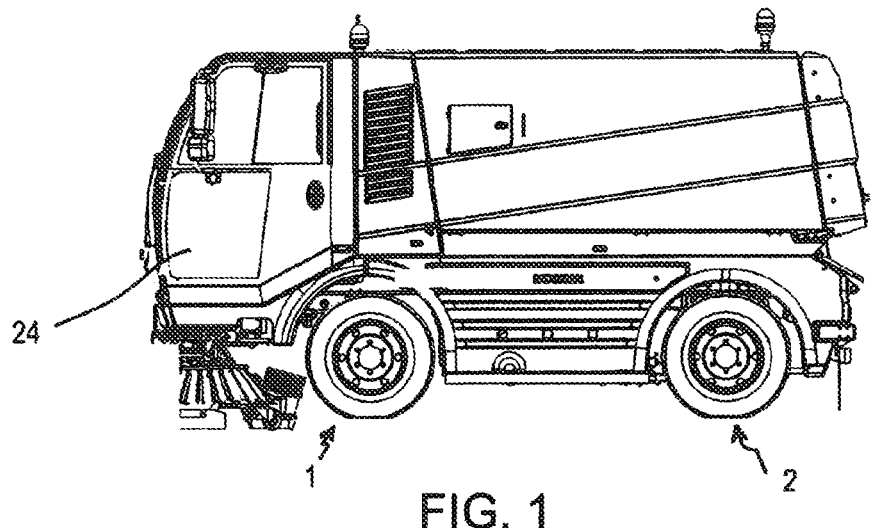
FIG. 1 shows a side view of a municipal vehicle.

A municipal vehicle shown in FIG. 1 in the form of a street sweeper has a front vehicle axle 1 and a rear vehicle axle 2 in relation to its main direction of travel. The front vehicle axle 1 is shown in FIG. 2 in a perspective view with its front side pointing in the main direction of travel facing the viewer, whereas FIG. 3 shows a top view of the rear side.

Figure 2:
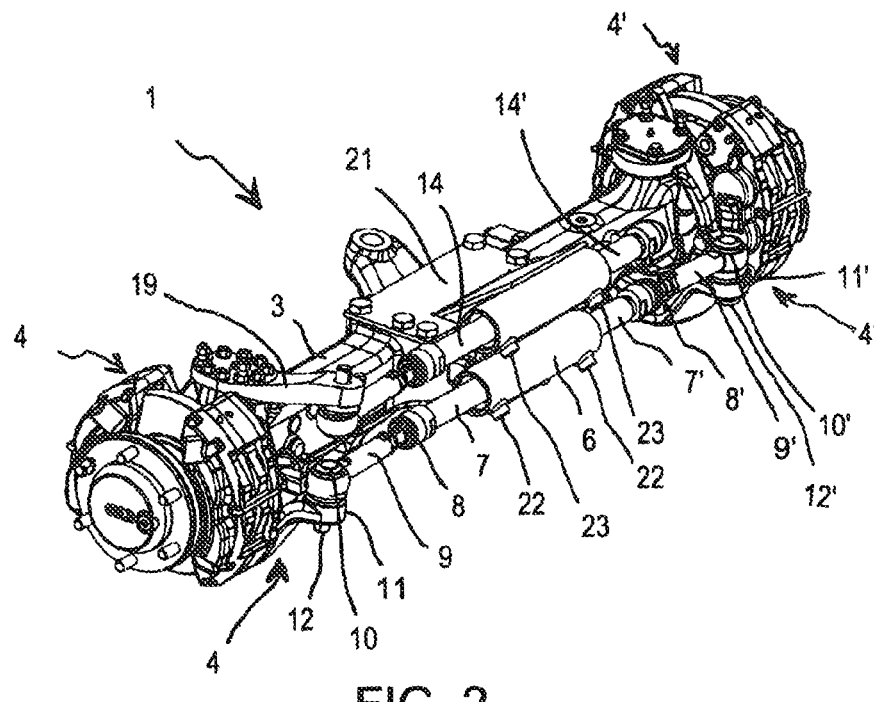
FIG. 2 shows a perspective view of a vehicle axle at the front in the direction of travel of the vehicle.
Figure 3:
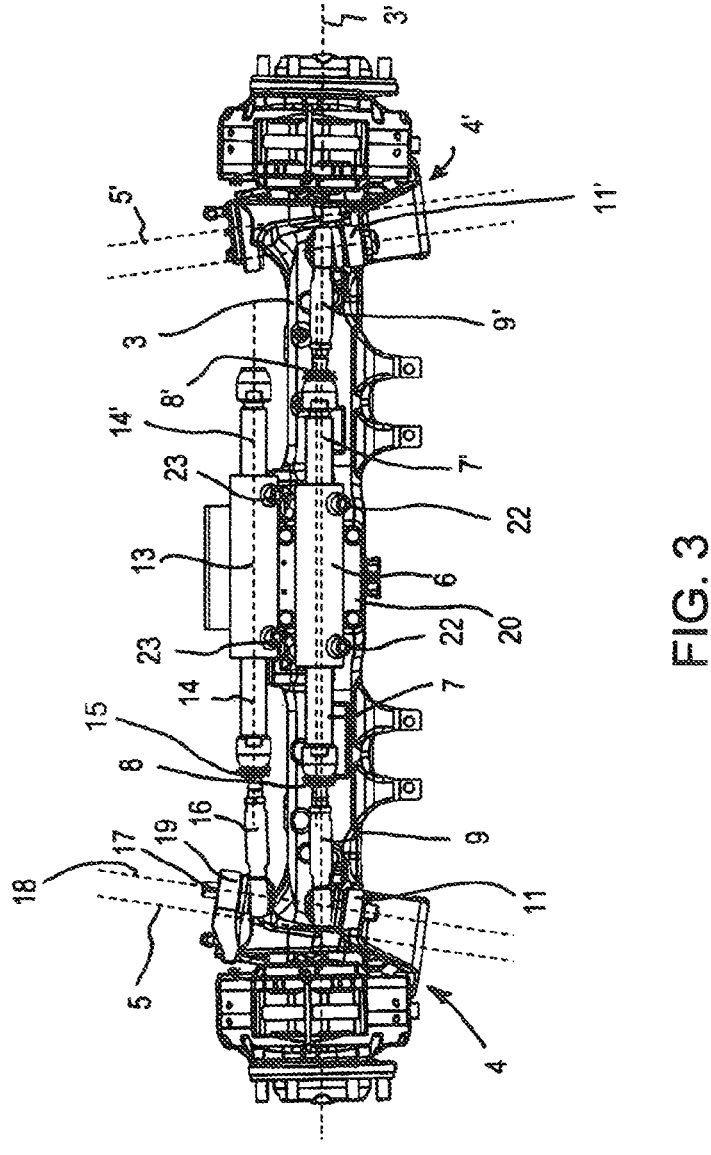
FIG. 3 shows a rear top view of the vehicle axle.

As can be seen in FIGS. 2 and 3, the vehicle axle 1 has a rigid axle body 3, which extends with its longitudinal axis 3' parallel to the track direction. A steering knuckle 4, 4' is articulated to each of the two axial end regions of the rigid axle body 3 and is pivotable about a respective steering axis 5, 5', indicated in FIG. 3 with dashed lines. The directions of these steering axes are inclined relative to a direction orthogonal to the longitudinal axis 3' and to the vehicle longitudinal axis, wherein the inclination in the direction of the longitudinal axis 3' is known as steering axis inclination, and the inclination in the direction of the vehicle longitudinal axis is known as trail. In other words, the steering axis inclination denotes the inclination of the steering axis relative to a perpendicular on the driving plane in the projection onto a plane perpendicular to the direction of travel. The trail denotes the inclination of the steering axis relative to a perpendicular to the driving plane in the projection onto a plane parallel to the direction of travel and perpendicular to the driving plane.

A hydraulic synchronous cylinder 6, in which a piston is mounted displaceably parallel to the longitudinal axis 3', is fastened to the side of the axle body 3 to the rear in the main direction of travel. The drive for the displacement movement takes place by supplying a hydraulic pressure medium into the cylinder chambers delimited on both sides of the piston in the cylinder. On both sides of the piston, piston rods 7, 7' that are connected to the piston and extend parallel to the longitudinal axis 3' are provided at their free ends pointing toward the steering knuckles 4, 4' with articulation points 8, 8', to each of which a respective main coupling member 9, 9' in the form of a tie rod is articulated.

The other end of the main coupling members 9, 9' in each case is articulated to the relevant steering knuckle 4, 4' by means of an articulation point 10, 10'. For this purpose, each of the two steering knuckles 4, 4' has a steering lever 11, 11', which extends transversely to the longitudinal axis 3' from a fastening region 12, 12' centered around the steering axis 5, 5' on the steering knuckle 4, 4' and, on its free end remote from the fastening region 12, 12', bears the articulation point 10, 10' for the main coupling member 9, 9'.

Furthermore, on the rear side of the rigid axle body 3 pointing counter to the main direction of travel, a synchronous cylinder 13 is fastened, which is identical to the synchronous cylinder 6 and the piston of which is likewise displaceable parallel to the longitudinal axis 3' by means of a hydraulic pressure medium. The two synchronous cylinders 6 and 13 are arranged above one another in relation to the installation position of the vehicle axle 1 in a vehicle, wherein the synchronous cylinder 13 is positioned above the synchronous cylinder 6 in relation to the driving plane of the vehicle.

An end of a tie rod forming an auxiliary coupling member 16 is articulated at an articulation point 15 to the free end of the left-side piston rod 14 of the synchronous cylinder 13 in FIGS. 2 and 3. The other end of the auxiliary coupling member 16 is articulated at an articulation point 17 to the steering knuckle 4 on the left in FIGS. 2 and 3. This articulation point 17 lies on a line 18 that runs at a distance from and parallel to the steering axis 5 and is shown dashed in FIGS. 3 to 5. Like the articulation point 10, this articulation point 17 is arranged on a free end region of a steering lever 19 that extends transversely to the longitudinal axis 3' and is connected to the steering knuckle 4 at its other end region centered around the steering axis 5. In contrast, the other piston rod 14' of the synchronous cylinder 13 is free, so it does not transfer any force or movement to the other steering knuckle 4' opposite it.

Figure 4:
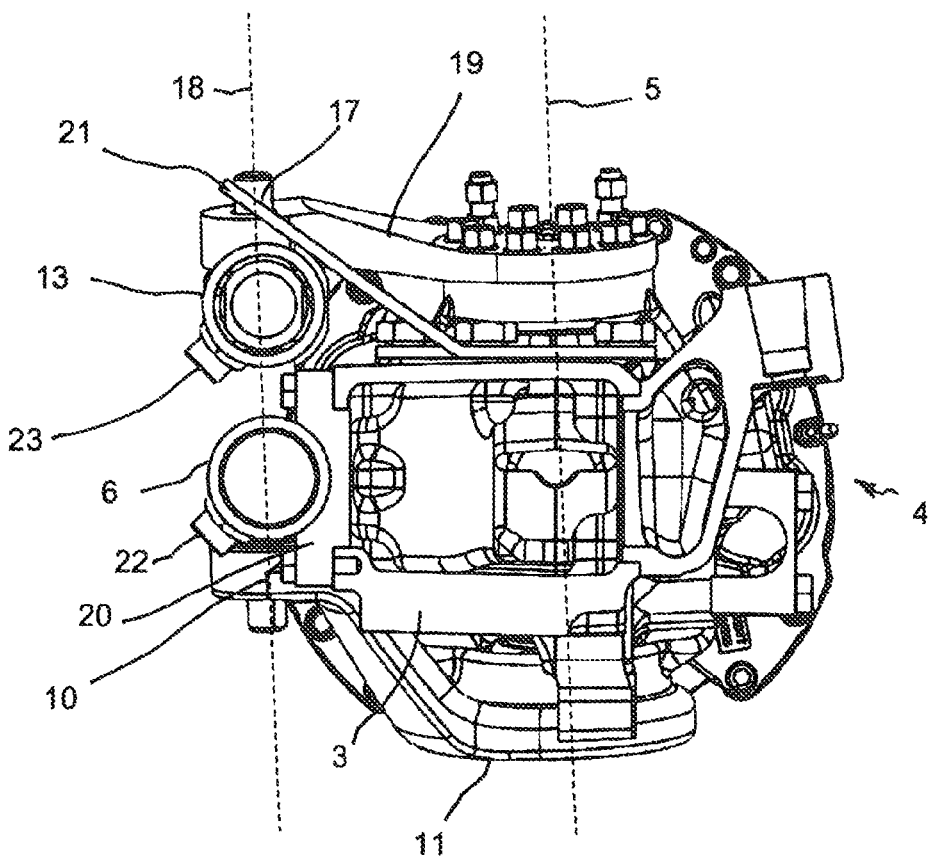
FIG. 4 shows a top view of the inner side, facing the axle body of the vehicle axle, of a steering knuckle.
Figure 5:
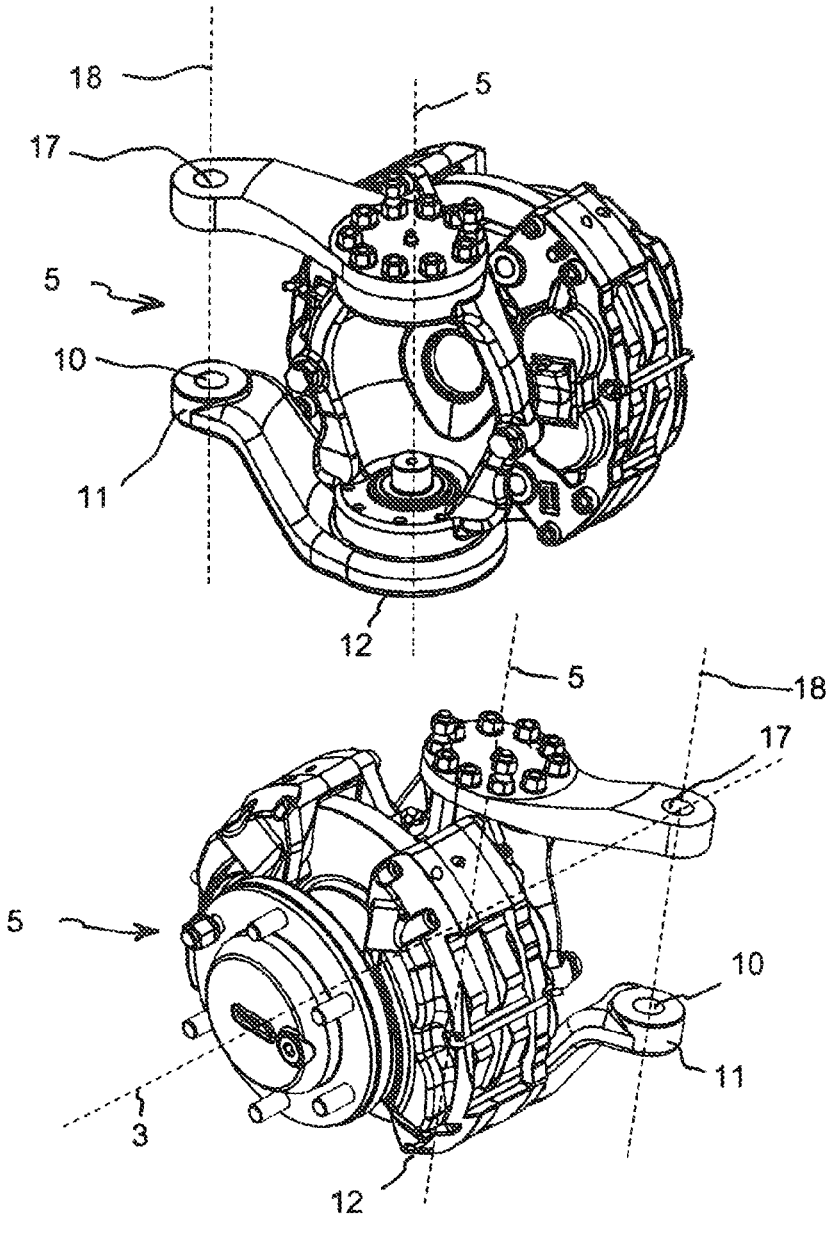
FIG. 5 shows respective perspective views of the steering knuckle toward its inner side facing the axle body and toward its outer side facing away from the axle body.

As can be seen in particular in FIGS. 2 to 4, the synchronous cylinders 6, 13 are provided with fastening flanges 20, 21, via which they are fastened to the rigid axle body 3 by means of fastening screws.

The connections 22, 23 of the synchronous cylinders 6 and 13, which are used to connect the pressure medium lines for the hydraulic operating pressure medium, can also be seen in FIGS. 2 to 4. Control valves and/or steering orbitrols (not shown) are used to control the supply and discharge of the operating pressure medium.

It can be seen in particular in FIGS. 2 and 3 that, in the event of a failure of the pressure medium supply of the synchronous cylinder 6, the steerability of the two steering knuckles 4, 4' can be maintained by the synchronous cylinder 13, because the latter effects the steering movement via its piston rod 14 and the auxiliary coupling member 16 on the steering knuckle 4 on the left in FIGS. 2 and 3, and from there the steering movement for the right-hand steering knuckle 4' is transmitted via the main coupling member 9, the piston rods 7, 7' of the synchronous cylinder 6 and the main coupling member 9' to the right-hand steering knuckle 4'. Therefore, the synchronous cylinder 6 is used as a main steering actuator device, and the synchronous cylinder 13 is used as an auxiliary steering actuator device for the steering of the vehicle axle 1.

In the municipal vehicle shown in FIG. 1, the driver's cab 24 is arranged in front of the front vehicle axle 1 as seen in the main direction of travel, in order to achieve a relatively short wheelbase. When installed, the synchronous cylinders 6, 13 are situated at the rear as seen in the main direction of travel. This facilitates the functional connection of the steering wheel arranged in the driver's cab 24 to the synchronous cylinders 6, 13.

LIST OF REFERENCE SIGNS

1 Front vehicle axle
2 Rear vehicle axle
3 Rigid axle body
3 'Longitudinal axis
4, 4' Steering knuckle
5, 5' Steering axis
6 Synchronous cylinder
7, 7' Piston rods
8, 8' Articulation points
9, 9 'Main coupling member
10, 10' Articulation point
11, 11' Steering lever
12, 12' Fastening region
13 Synchronous cylinder
14, 14' Piston rod
15 Articulation point
16 Auxiliary coupling member
17 Articulation point
18 Dashed line
19 Steering lever
20, 21 Fastening flanges
22, 23 Connections
24 Driver's cab

The invention claimed is:

1. A vehicle axle, comprising: two steering knuckles, each of the steering knuckles being articulated pivotably about a respective steering axis to one of two articulation regions that are axially spaced from one another in relation to a longitudinal axis parallel to a track direction;
   a main steering actuator device including a pressure-medium-operated piston-cylinder assembly having two piston rods that extend parallel to the longitudinal axis and on free ends of which an end of a main coupling member is arranged at a respective articulation point, an other end of the main coupling member being articulated to a respective steering knuckle at a respective articulation point; and
   an auxiliary steering actuator device that acts on one of the steering knuckles, wherein the auxiliary steering actuator device includes a piston-cylinder assembly having a piston rod that extends parallel to the longitudinal axis and to a free end of which an auxiliary coupling member is articulated at an articulation point, an other end of the auxiliary coupling member being articulated to the steering knuckle at an articulation point that lies on a line, which is parallel to and spaced from the steering axis, through the articulation point of the main coupling member.

2. The vehicle axle according to claim 1, wherein the piston-cylinder assembly of the main steering actuator device is designed as a synchronous cylinder in which the two piston rods are arranged on both sides of a piston of the piston-cylinder assembly.

3. The vehicle axle according to claim 1, wherein the steering knuckles have steering levers, and the steering-knuckle-side articulation points of the main coupling member and/or of the auxiliary coupling member are arranged on the steering levers of the steering knuckles.

4. The vehicle axle according to claim 1, wherein the piston-cylinder assemblies of the main steering actuator device and of the auxiliary steering actuator device are arranged over one another in relation to the directions of the steering axes.

5. The vehicle axle according to claim 1, wherein the piston-cylinder assemblies of the main steering actuator device and of the auxiliary steering actuator device have a common design.

6. The vehicle axle according to claim 1, wherein the articulation regions of the steering knuckles are formed on axial end regions of a rigid axle body.

7. The vehicle axle according to claim 6, wherein cylinders of the main steering actuator device and of the auxiliary steering actuator device are fastened to the axle body.

8. The vehicle axle according to claim 1, wherein a cylinder of the main steering actuator device and/or a cylinder of the auxiliary steering actuator device is connected to a steering orbitrol used for the pressure medium operation of the cylinder.

9. An arrangement of a vehicle axle according to claim 1 on a vehicle, wherein the main steering actuator device and the auxiliary steering actuator device are arranged on a side of the vehicle axle facing counter to a direction of travel of the vehicle.

10. The arrangement according to claim 9, wherein the auxiliary steering actuator device is arranged over the main steering actuator device.

11. The arrangement according to claim 9, wherein the vehicle is a commercial vehicle.

12. The arrangement according to claim 9, wherein the vehicle is a municipal vehicle.

* * * * *